United States Patent Office 3,217,400
Patented Nov. 16, 1965

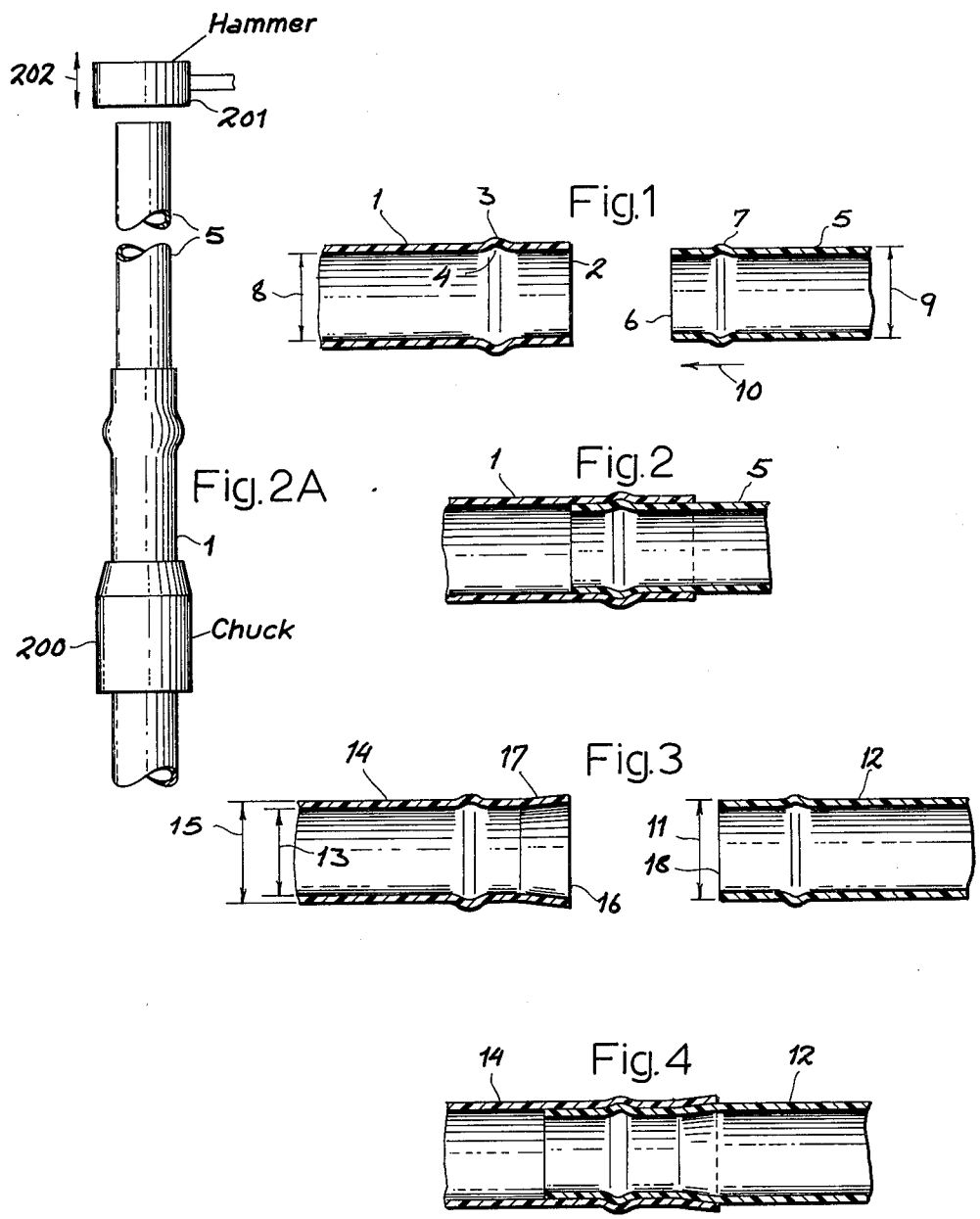

3,217,400
METHOD OF CONNECTING THERMOPLASTIC PIPE SECTIONS AND THE LIKE
Otto Illesy, Erdingen Post Wilderbergerhutte, Erdingen, Bezirk Cologne, Germany, and Werner Schmidt, Auf dem Eichholzchen, Morsbach, Sieg, Eichholzchen, Germany
Filed Feb. 23, 1960, Ser. No. 10,118
Claims priority, application Germany, Feb. 26, 1959, P 22,289; Mar. 10, 1959, P 22,367; May 6, 1959, P 22,740; May 26, 1959, P 22,843; June 13, 1959, P 22,963; Oct. 16, 1959, P 23,698
3 Claims. (Cl. 29—453)

This invention relates to a method of connecting hardened parts, especially tubular pipe sections consisting of suitable thermoplastic materials.

For connecting metal parts, especially pipes, it has already been proposed to form the joint between pipe sections of different diameters and to insert the smaller diameter pipe into the larger.

In order to secure the connection between the two pipes, a bead or bulge is formed on the smaller pipe after it has been inserted, so that the bead or bulge on the smaller pipe will engage a corresponding recess in the pipe of larger diameter. This method of forming a joint between metal pipes is troublesome for two reasons. On the one hand, at least two operations are necessary, namely the operation of telescoping the two pipe ends together, and the operation of forming the bulge or bead, and on the other hand the provision of the bulge after insertion is technically awkward because the introduction of the forming tools into the telescoped pipe ends presents difficulties.

According to the present invention these disadvantages are overcome, more particularly in the case of hardened thermoplastic parts, especially pipes, in that one of the parts, conveniently the pipe section intended to be the outer member of the joint is preformed near its end with an internal annular groove, whereas the cooperating pipe section, which is intended to be the inner member of the completed joint, is preformed near its end with an annular bulge, said groove and bulge being formed on said pipe sections when these are produced and having appropriate dimensions to permit the ends of the pipe sections to be axially telescoped by the temporary elastic expansion and compression of the two sections until groove and bulge have engaged.

To enable the ends of the two pipe sections to be thus telescoped for the purpose of connecting them together and at the same time to prevent them from separating when subjected to axial pull or at least to make such separation more difficult, it is proposed to select a thermoplastic material for making the pipe sections which will be yieldable after it has been hardened and cooled, and which will exhibit at least sufficient elastic deformability to permit the portion of pipe on the outside of the joint to expand when the end of the inner pipe is inserted therein and the projecting bulge on the inner pipe section to slide into the interior of the expanding outer portion of pipe until its bulge engages the annular groove within the outer pipe. The withdrawal of one pipe end from the inside of the other and the separation of the two pipes will then be prevented by the elastic resistance of the thermoplastic material.

In the practical application of the proposed method of connecting two such pipe sections together it has been found convenient if the pipe section which is intended to be the outer member is held in a chuck or a collet and the pipe which is to serve as the inner member is driven into the outer pipe section by the gradual application of pressure or by the administration of sharp taps, for instance, in a press or with the aid of a hammer, a falling weight, or the like.

According to the invention two pipe sections which are devoid of annular grooves or bulges can likewise be connected together if the relative dimensions of the two pipe sections are suitably chosen to permit an inner pipe section to be pressed or tapped into an outer pipe section with the simultaneous elastic deformation thereof. With due regard to the expansibility and elasticity of the thermoplastic material the dimensions of the two pipe sections may be so chosen that both have equal internal and external diameters or that the inner pipe sections has an outer diameter which slightly exceeds the internal diameter of the outer pipe section. In any event, in such a joint between pipe sections which are devoid of annular bulges or grooves, the dimensions must be such that after the pipe sections have been telescoped together they will engage with a tight frictional fit for establishing a rigid connection between them. If a particularly tight and rigid connection is desired and especially one which will reliably prevent the separation of the pipes when these are subjected to axial pull, it may be advisable not only to select the dimensions of the two pipe sections in such a manner that they will frictionally tightly engage, but in addition also to provide an annular bulge and a groove respectively in the two cooperating pipe sections, which will positively engage when the pipe sections are telescoped together.

According to another possible way of performing the invention an outer pipe section provided with an annular bulge or a constricted portion set off from the rest of the pipe by a shoulder may be inserted into a correspondingly narrower inner pipe section without one or both of the pipe sections being elastically deformed. A rigid or axially rotatable connection between the two cooperating members, which cannot be subsequently undone, may then be established by first telescoping the two ends of the pipe sections together and then flaring or expanding the end of the inner section by the application of heat to the inner end of the inner pipe. To this end a cylindrical plunger, preferably formed with a cone-shaped end, is inserted into the open outer end of the outer pipe section in such manner that upon making contact with the end of the inner pipe section the latter will be thermoplastically expanded. To soften the end of the inner pipe section while avoiding the simultaneous deformation of the outer pipe section the process of expansion must be quickly performed.

The invention will now be more particularly described with reference to the accompanying drawings in which:

FIGURE 1 is an axial section showing the ends of two pipes which are to be connected together, one pipe having a smaller diameter than the other;

FIGURE 2 is a similar section showing the two pipes of FIGURE 1, after the joint has been formed;

FIGURE 2A is a schematic elevational view illustrating the means for connecting the two pipes;

FIGURE 3 is a view similar to FIG. 1 showing another embodiment of the invention in which the two pipes that are to be connected together are of like diameter and the end of the pipe which is to form the outside member in the joint is flared;

FIGURE 4 is a view similar to FIG. 2 showing the two pipe ends according to FIGURE 3 after having been telescoped together.

With reference now to FIGS. 1 and 2 it will be seen that the outer pipe member 1 near its end 2 has an annular bulge or corrugation 3 which projects radially outwards and forms a groove in the pipe interior. The member 5 which is to be joined to pipe member 1 has a corresponding annular bulge or corrugation 7 near its cooperating end 6. The diameters of the two pipe members match in such manner that the internal diameter 8 of the pipe member 1 which will be on the outside of the joint corresponds with the outer diameter of pipe member 5 which will be on the inside of the joint. The pipe member 5 having the smaller diameter is now pushed in the direction or arrow 10 into the open end 2 of pipe member 1. At first, the insertion of the smaller-diameter pipe requires no major effort until the annular bulge 7 on the inner pipe member 6 makes contact with the end face 2 of the outer pipe member 1. From this moment onwards the inner pipe member must be thrust with a certain amount of force axially into the outer pipe member, causing the outer pipe member 1 slightly to expand, whereas the inner pipe member 5 is slightly compressed in the region of the annular bulge 7. Finally, the annular bulge 7 reaches the groove 4 formed in the interior of the outer pipe member 1 and engages the same. At the same time the outer pipe which has been slightly expanded in the region between the end 2 of the pipe and the annular groove 4 will again contract to resume its former shape owing to the elastic properties of the hardened thermoplastic material (e.g. rigid polyvinyl chloride) of which it is made. Simultaneously the annular bulge 7 which had been temporarily compressed during the process of insertion will again resume its former shape. This will occur when the annular bulge 7 snaps or drops into the annular groove 4. The expansibility and elasticity of the material permit the two cooperating members to be preformed, i.e. to be provided with the annular indented corrugations, in the process of their manufacture and nevertheless to be securely joined simply by being telescoped together and without any subsequent deformational process being required. The chuck 200 of FIG. 2A supports the outer pipe 1 while a hammer 201 is reciprocable as indicated by the arrow 202 to drive the inner pipe 5 into the outer member by successive impacts.

The embodiment shown in FIGURES 3 and 4 constitutes a modification of the construction shown in FIGURES 1 and 2 insofar as the overall diameter 11 of the pipe member 12 which will be located on the inside of the joint is not arranged to be equal to the internal diameter 13 of the pipe member 14 which will be on the outside of the joint but equal to the outer diameter 15 of the outside pipe member 14. To permit the pipe ends nevertheless to be simply inserted the one into the other, the end 16 of the pipe member 14 which will be on the outside of the joint may conveniently be slightly bell-mouthed as shown at 17 so that the end 18 of pipe member 12 which will be on the inside of the joint can be pushed into the same. By comparison with the embodiment according to FIGURES 1 and 2 there is only a purely quantitative difference in the process of telescoping the pipes inasmuch as the outer and inner pipe members will be more considerably expanded or compressed in the region where the joint is formed.

It has been found that polyvinyl chloride is a particularly suitable plastic material.

The invention described and illustrated is believed to admit of many modifications within the ability of persons skilled in the art, all such modifications being considered within the spirit and scope of the appended claims.

We claim:

1. A method of forming a joint between two elongated tubular pipe sections of uniform wall thickness made of rigid but elastically deformable synthetic resin, one of said sections having an inner diameter slightly smaller than the outer diameter of the other of said sections, which comprises the steps of permanently deforming each of said sections at a location close to but spaced from one of its ends with an outwardly convex transverse annular corrugation of the same wall thickness as the remainder of the section, aligning said sections with the said ends thereof in confronting relationship, and driving said other of said sections by repeated axial blows into said one of said sections until the corrugations thereof interengage and said sections are in frictional contact under radial compression over an axial extent at least equal to that of the corrugation.

2. A method as defined in claim 1 wherein said end of said other of said sections is widened into an outwardly flared shape before receiving the confronting end of said one of said sections.

3. A method as defined in claim 1 wherein said synthetic resin is polyvinyl chloride.

References Cited by the Examiner
UNITED STATES PATENTS

| | | | |
|---|---|---|---|
| 1,175,402 | 3/1916 | Baylis | 285—7 |
| 1,187,642 | 6/1916 | Milz | 285—261 |
| 2,094,147 | 9/1937 | Forsberg | 285—7 |
| 2,567,773 | 9/1951 | Krupp | 285—260 |
| 2,650,114 | 8/1953 | Epstein | 285—304 |
| 2,717,619 | 9/1955 | Whitman | 220—60 |
| 2,739,829 | 3/1956 | Pedlow et al. | 154—118 |
| 2,788,231 | 4/1957 | Crow | 285—107 |
| 2,889,089 | 6/1959 | Herrick et al. | 285—423 X |
| 2,947,071 | 8/1960 | Marchant | 29—453 X |
| 2,985,469 | 5/1961 | Bowman. | |
| 2,998,644 | 9/1961 | Thill | 29—275 |

FOREIGN PATENTS

| | | |
|---|---|---|
| 1,131,380 | 10/1956 | France. |
| 561,242 | 10/1932 | Germany. |
| 549,361 | 11/1942 | Great Britain. |

WHITMORE A. WILTZ, *Primary Examiner.*

CARL F. KRAFFT, CARL W. TOMLIN, NEDWIN BERGER, *Examiners.*